US012631515B2

(12) United States Patent
Oh et al.

(10) Patent No.:  US 12,631,515 B2
(45) Date of Patent:  May 19, 2026

(54) LEAK INSPECTION APPARATUS AND METHOD FOR SECONDARY BATTERY CELL

(71) Applicant: HANA TECHNOLOGY CO., LTD., Yongin-si (KR)

(72) Inventors: Tae Bong Oh, Suwon-si (KR); Souk Woo Lee, Hwaseong-si (KR); Jung Ho Song, Suwon-si (KR); Seung A Han, Seoul (KR); Sang Rae Kim, Yongin-si (KR)

(73) Assignee: HANA TECHNOLOGY CO., LTD., Yongin-si (KR)

( * ) Notice: Subject to any disclaimer, the term of this patent is extended or adjusted under 35 U.S.C. 154(b) by 291 days.

(21) Appl. No.: 18/418,863

(22) Filed: Jan. 22, 2024

(65) Prior Publication Data

US 2025/0237573 A1     Jul. 24, 2025

(51) Int. Cl.
*G01M 3/26*          (2006.01)
*H01M 10/42*          (2006.01)

(52) U.S. Cl.
CPC ......... *G01M 3/26* (2013.01); *H01M 10/4228* (2013.01)

(58) Field of Classification Search
CPC ......... H01M 10/4285; H01M 10/4228; G01M 3/26; G01M 3/363
See application file for complete search history.

(56) References Cited

U.S. PATENT DOCUMENTS

| | | | | |
|---|---|---|---|---|
| 3,837,215 A * | 9/1974 | Massage | ............... | G01M 3/363 73/49.3 |
| 4,409,818 A * | 10/1983 | Wyslotsky | ............ | G01M 3/363 73/49.3 |
| 4,709,578 A * | 12/1987 | Iwasaki | ................. | G01M 3/363 73/49.3 |
| 4,803,868 A * | 2/1989 | Vinton | .................. | G01M 3/363 73/49.3 |
| 4,893,499 A * | 1/1990 | Layton | .................. | G01M 3/363 73/49.3 |
| 5,226,316 A * | 7/1993 | Mally | ................... | G01M 3/363 73/49.3 |
| 6,635,379 B2 * | 10/2003 | Onishi | ............. | H01M 10/4285 429/49 |
| 9,885,629 B2 * | 2/2018 | Baba | ..................... | G01M 3/363 |
| 10,184,778 B2 * | 1/2019 | Yoon | ...................... | G01B 7/06 |
| 10,957,943 B2 * | 3/2021 | Kim | ..................... | H01M 10/42 |
| 11,112,329 B2 * | 9/2021 | Haug | ................... | G01M 3/363 |
| 11,374,264 B2 * | 6/2022 | Fukuoka | ........... | H01M 10/4228 |

(Continued)

FOREIGN PATENT DOCUMENTS

| | | |
|---|---|---|
| KR | 10-2015-0026534 A | 3/2015 |
| KR | 10-2015-0145404 A | 12/2015 |

(Continued)

*Primary Examiner* — Tran M. Tran
(74) *Attorney, Agent, or Firm* — Bridgeway IP Law Group, PLLC; Jihun Kim

(57)          ABSTRACT

A leak inspection apparatus for secondary battery cells and a leak inspection method for secondary battery cells are to determine whether leakage occurs in a secondary battery cell being inspected by creating a pressure difference between the inside of a casing of the secondary battery cell accommodated in a chamber part and the internal space of the chamber part and detecting swelling of the secondary battery cell.

19 Claims, 10 Drawing Sheets

(56)                  References Cited

U.S. PATENT DOCUMENTS

| | | | | |
|---|---|---|---|---|
| 11,650,122 B2 * | 5/2023 | Hwang | ................. | H01M 10/48 |
| | | | | 429/90 |
| 11,815,429 B2 * | 11/2023 | Kim | ...................... | G01M 3/363 |
| 11,916,199 B2 * | 2/2024 | Lee | .......................... | G01B 7/06 |
| 12,040,503 B2 * | 7/2024 | Pokora | ............... | H01M 10/486 |
| 12,051,784 B2 * | 7/2024 | Park | ................. | H01M 10/4285 |
| 12,191,456 B2 * | 1/2025 | Lee | ...................... | H01M 10/48 |
| 12,247,938 B2 * | 3/2025 | Nakashima | ............ | G01B 11/06 |
| 12,265,068 B2 * | 4/2025 | Jung | ....................... | G01M 3/16 |
| 12,339,307 B2 * | 6/2025 | Kim | ...................... | G01R 31/16 |
| 12,456,761 B2 * | 10/2025 | Park | ...................... | G01M 3/329 |
| 2012/0208054 A1 * | 8/2012 | Shirasawa | ......... | H01M 10/0468 |
| | | | | 429/90 |
| 2021/0041334 A1 * | 2/2021 | Adler | ....................... | G01N 3/32 |
| 2021/0172827 A1 * | 6/2021 | Hwang | .............. | G01M 3/3272 |
| 2022/0166078 A1 * | 5/2022 | Kim | ................... | H01M 10/486 |
| 2022/0357233 A1 * | 11/2022 | Lee | .................... | G01M 3/3227 |
| 2023/0081216 A1 * | 3/2023 | Park | ................... | H01M 10/486 |
| | | | | 429/90 |
| 2023/0253633 A1 * | 8/2023 | Cohen | ............... | H01M 10/4228 |
| | | | | 429/90 |
| 2023/0299311 A1 * | 9/2023 | Yamada | ............. | H01M 8/0267 |
| 2024/0255375 A1 * | 8/2024 | Borkus | ............. | G01N 21/9009 |
| 2024/0347780 A1 * | 10/2024 | Park | ................. | H01M 10/4228 |
| 2024/0387883 A1 * | 11/2024 | Gonin | ................... | G01M 3/202 |
| 2024/0429461 A1 * | 12/2024 | Kim | ................. | H01M 10/4228 |
| 2025/0116567 A1 * | 4/2025 | Wu | ...................... | G01M 99/007 |
| 2025/0125427 A1 * | 4/2025 | Cai | ................... | H01M 10/4228 |
| 2025/0137870 A1 * | 5/2025 | He | .................... | H01M 10/4228 |
| 2025/0244192 A1 * | 7/2025 | Zhang | ..................... | G01M 3/02 |
| 2026/0009693 A1 * | 1/2026 | Stasch | ..................... | G01M 3/26 |

FOREIGN PATENT DOCUMENTS

| | | | |
|---|---|---|---|
| KR | 10-2019-0107933 | A | 9/2019 |
| KR | 10-2022-0015551 | A | 2/2022 |
| KR | 10-2381108 | B1 | 3/2022 |
| KR | 10-2454249 | B1 | 10/2022 |

* cited by examiner

SN

S50 calculate changes in initial pressure values and inspection pressure values for sensor nodes   ~S570 calculate average value of changes of sensor nodes   ~S590

S60

LEAK INSPECTION APPARATUS AND METHOD FOR SECONDARY BATTERY CELL

BACKGROUND OF THE INVENTION

Field of the Invention

The present disclosure relates to a leak inspection apparatus for secondary battery cells and a leak inspection method for secondary battery cells and, more particularly, to a leak inspection apparatus for secondary battery cells and a leak inspection method for secondary battery cells to determine whether leakage occurs in a secondary battery cell being inspected by creating a pressure difference between the inside of a casing of the secondary battery cell accommodated in a chamber part and the internal space of the chamber part and detecting swelling of the secondary battery cell.

Description of the Related Art

Recently, as the development of electric vehicles, energy storage batteries, robots, and satellites has begun in earnest, research on secondary batteries, high-performance batteries capable of repeated charging and discharging, is actively underway. Currently commercialized secondary batteries include nickel-cadmium batteries, nickel-hydrogen batteries, nickel-zinc batteries, and lithium secondary batteries. Among these, lithium secondary batteries are in the spotlight for their advantages of very low self-discharge rate, high energy density, and free charging and discharging as the lithium secondary batteries have almost no memory effect compared to nickel-based secondary batteries.

Secondary batteries are manufactured in various ways depending on the shape of a casing that houses an electrode assembly. Representative shapes include cylindrical, prismatic, and pouch types. In general, cylindrical secondary batteries are encased in cylindrical aluminum cans, and prismatic secondary batteries are packaged in square aluminum cans. For pouch-type secondary batteries, a thin aluminum laminated film made of materials such as aluminum sealed into a pouch in the form of a pack is used for a casing. The pouch-type secondary batteries have been widely used in recent years since they are relatively lightweight and have excellent stability.

A pouch-type secondary battery is completed by injecting electrolytes into a pouch containing a battery cell, which consists of a negative electrode, a positive electrode, and a separator therebetween, and then sealing the pouch. The secondary battery manufactured in this way operates in such a way that ions are generated from the electrolytes injected between the negative electrode and the positive electrode and move between the electrodes, thereby generating electromotive force and causing charging and discharging by this action. Accordingly, the secondary battery has a sealed structure that prevents electrolyte loss that affects charge and discharge capacity and prevents electrolyte leakage by taking into account internal pressure.

When electrolytes leak from a secondary battery due to poor airtightness of a casing, the battery is treated as a defective product. Thus, a leak inspection is performed at the manufacturing process line, and usually, the inspection is performed by visually checking a welded area of a cap plate welded to a casing. However, this inspection method inevitably leads to differences depending on the worker's skill level.

In order to solve the above-described problems, the inventors of the present disclosure have proposed a leak inspection apparatus for secondary battery cells and a leak inspection method for secondary battery cells with an improved structure/method, details of which will be described later.

DOCUMENTS OF RELATED ART (Patent Document 0001) Korean Patent Application Publication No. 10-2015-0026534 "APPARATUS FOR LEAKAGE TEST OF SECONDARY BATTERY"

SUMMARY OF THE INVENTION

The present disclosure has been made to solve the problems of the related art, and an objective of the present disclosure is to provide a leak inspection apparatus for secondary battery cells and a leak inspection method for secondary battery cells, which enable easy determination of whether a leak occurs in a secondary battery cell by creating a pressure difference between the inside of a casing of the secondary battery cell accommodated in a chamber part and the internal space of the chamber part and detecting swelling of the secondary battery cell.

In addition, an objective of the present disclosure is to provide a leak inspection apparatus for secondary battery cells and a leak inspection method for secondary battery cells, which allow an operator to visually check the degree of vacuum formation in the space inside a chamber part by forming a pressure sensor on one side of the chamber part.

In addition, an objective of the present disclosure is to provide a leak inspection apparatus for secondary battery cells and a leak inspection method for secondary battery cells, which enable easy sealing and opening of a chamber part by not forming a separate configuration for coupling between a moving part and a cover part.

In addition, an objective of the present disclosure is to provide a leak inspection apparatus for secondary battery cells and a leak inspection method for secondary battery cells, which improve space efficiency by forming a pressure distribution detection part disposed on one side of a second plate as a film-type pressure measurement distribution sensor (or surface pressure sensor).

In addition, an objective of the present disclosure is to provide a leak inspection apparatus for secondary battery cells and a leak inspection method for secondary battery cells, which enable a leak point to be identified in a secondary battery cell being inspected by utilizing a pressure distribution detection part of a pressure measurement distribution sensor as mentioned above.

In addition, an objective of the present disclosure is to provide a leak inspection apparatus for secondary battery cells and a leak inspection method for secondary battery cells, which enable intuitive recognition by an operator since a pressure value for each sensor node measured by a pressure distribution detection part is displayed as a numerical value or as in different colors for each pressure value by means of a display part of a controller.

In addition, an objective of the present disclosure is to provide a leak inspection apparatus for secondary battery cells and a leak inspection method for secondary battery cells, which extend the lifespan of a pressure distribution detection part and improve sensitivity by placing a cushioning material between the pressure distribution detection part and a second plate or on the surface of the second plate opposite to a secondary battery cell.

In addition, an objective of the present disclosure is to provide a leak inspection apparatus for secondary battery cells and a leak inspection method for secondary battery cells, which ensure that the opposing surface of a secondary battery cell being inspected remains flat by utilizing a cushioning material as mentioned above.

In addition, an objective of the present disclosure is to provide a leak inspection apparatus for secondary battery cells and a leak inspection method for secondary battery cells, which improve process efficiency by enabling simultaneous inspection of multiple secondary battery cells by forming multiple inspection parts within a single chamber part.

In addition, an objective of the present disclosure is to provide a leak inspection apparatus for secondary battery cells and a leak inspection method for secondary battery cells, which prevent losses due to the vacuum pump on/off operation time as much as possible by allowing a vacuum pump to operate at all times.

In addition, an objective of the present disclosure is to provide a leak inspection apparatus for secondary battery cells and a leak inspection method for secondary battery cells, which shorten the vacuum formation time in the internal space of a chamber part as much as possible by forming a plurality of vacuum pumps.

In addition, an objective of the present disclosure is to provide a leak inspection apparatus for secondary battery cells and a leak inspection method for secondary battery cells, which shorten the time for the internal pressure of a chamber part to reach atmospheric pressure by forming a vacuum breaking part that supplies gas such as inert gas to the internal space of the chamber part after completing a leak inspection.

In addition, an objective of the present disclosure is to provide a leak inspection apparatus for secondary battery cells and a leak inspection method for secondary battery cells to easily determine whether a secondary battery cell is a good product or not by providing a controller that determines whether the secondary battery cell leaks by setting initial pressure values of sensor nodes of a pressure distribution detection part to zero, calculating a modified inspection pressure value for each sensor node by subtracting an initial pressure value corresponding to an inspection pressure value, and deriving an average value of modified inspection pressure values of all sensor nodes.

In addition, an objective of the present disclosure is to provide a leak inspection apparatus for secondary battery cells and a leak inspection method for secondary battery cells, which minimize the load on a controller by providing the controller that determines whether a secondary battery cell leaks by calculating the amount of change in an initial pressure value and an inspection pressure value for each sensor node of a pressure distribution detection part, and calculating an average value of the changes of all sensor nodes, thereby eliminating the need for a separate zero setting.

The present disclosure may be implemented by embodiments having the following configuration to achieve the above-described objectives.

According to an embodiment of the present disclosure, there is provided a leak inspection apparatus for secondary battery cells. The apparatus includes: a chamber part configured to form an internal space; a first plate disposed in the internal space of the chamber part and allowing a first side of a secondary battery cell subject to inspection to be seated on a side thereof; a second plate configured to be spaced apart from the first plate and to press a second side facing the first side of the secondary battery cell; a pressure distribution detection part disposed between the second plate and the secondary battery cell and detecting pressure of the secondary battery cell; a vacuum part configured to communicate with the internal space of the chamber part to form a vacuum in the internal space of the chamber part; and a controller configured to determine whether a leak occurs in the secondary battery cell.

According to another embodiment of the present disclosure, in the leak inspection apparatus for secondary battery cells according to the present disclosure, the chamber part may include: a moving part on which the first plate is seated on a side thereof; and a cover part configured to form the internal space of the chamber part together with the moving part.

According to still another embodiment of the present disclosure, in the leak inspection apparatus for secondary battery cells according to the present disclosure, the pressure distribution detection part may be a film-type pressure measurement distribution sensor.

According to still another embodiment of the present disclosure, in the leak inspection apparatus for secondary battery cells according to the present disclosure, the pressure distribution detection part may include sensor nodes and transmit a pressure value measured by each sensor node to the controller.

According to still another embodiment of the present disclosure, the leak inspection apparatus for secondary battery cells according to the present disclosure may further include: a buffer member between the pressure distribution detection part and the second plate or on a surface of the second plate facing the secondary battery cell, wherein the buffer member may contain silicone material.

According to still another embodiment of the present disclosure, in the leak inspection apparatus for secondary battery cells according to the present disclosure, the vacuum part may include: a first pipe communicating with the internal space of the chamber part; a first valve between the first pipe and a second pipe; the second pipe with a first end thereof is connected to the first valve, and a second end thereof is connected to a vacuum pump; and the vacuum pump that creates vacuum in the internal space of the chamber part.

According to still another embodiment of the present disclosure, in the leak inspection apparatus for secondary battery cells according to the present disclosure, the vacuum pump may operate at all times.

According to still another embodiment of the present disclosure, the leak inspection apparatus for secondary battery cells according to the present disclosure may further include: a vacuum breaking part that supplies gas, after an inspection of the secondary battery cell is completed, to the internal space of the chamber part where the internal space is vacuum formed.

According to still another embodiment of the present disclosure, in the leak inspection apparatus for secondary battery cells according to the present disclosure, the vacuum breaking part may be configured to supply an inert gas to the internal space of the chamber part.

According to still another embodiment of the present disclosure, in the leak inspection apparatus for secondary battery cells according to the present disclosure, the controller may include: an initial pressure value measurement module that receives initial pressure values measured by the sensor nodes of the pressure distribution detection part before the internal space of the chamber part is vacuum formed in a state where the chamber part is sealed; and an inspection pressure value measurement module that receives inspection pressure values of the sensor nodes of the pressure distribution detection part after the internal space of the chamber part is vacuum formed.

According to still another embodiment of the present disclosure, in the leak inspection apparatus for secondary battery cells according to the present disclosure, the controller may further include: an initial pressure value modification module that zero sets the initial pressure values of the individual sensor nodes; and an inspection pressure value modification module that calculates modified inspection pressure values for the individual sensor nodes by subtracting the initial pressure values from the inspection pressure values.

According to still another embodiment of the present disclosure, in the leak inspection apparatus for secondary battery cells according to the present disclosure, the controller may further include: an average value calculation module that calculates an average value of the modified inspection pressure values for the sensor nodes calculated by the inspection pressure value modification module.

According to still another embodiment of the present disclosure, in the leak inspection apparatus for secondary battery cells according to the present disclosure, the controller may further include: a change amount calculation module that calculates changes in the initial pressure values and the inspection pressure values for the individual sensor nodes, and then calculates an average value of the changes for the sensor nodes.

According to still another embodiment of the present disclosure, in the leak inspection apparatus for secondary battery cells according to the present disclosure, the controller may further include: a good/bad determination module that compares the average value with a reference set value to determine whether a leak occurs in the secondary battery cell.

According to still another embodiment of the present disclosure, in the leak inspection apparatus for secondary battery cells according to the present disclosure, the first plate, the second plate, and the pressure distribution detection part may be provided in plurality and arranged in parallel in the internal space of the chamber part.

According to an embodiment of the present disclosure, there is provided a leak inspection method for secondary battery cells, the method being performed using a leak inspection apparatus for secondary battery cells, the apparatus including: a chamber part configured to form an internal space; a first plate disposed in the internal space of the chamber part and allowing a first side of a secondary battery cell subject to inspection to be seated on a side thereof; a second plate configured to be spaced apart from the first plate and to press a second side facing the first side of the secondary battery cell; a pressure distribution detection part disposed between the second plate and the secondary battery cell and detecting pressure of the secondary battery cell; a vacuum part configured to communicate with the internal space of the chamber part to form a vacuum in the internal space of the chamber part; a vacuum breaking part configured to supply gas, after an inspection of the secondary battery cell is completed, to the internal space of the chamber part where the internal space is vacuum formed; and a controller configured to determine whether a leak occurs in the secondary battery cell, the method including: sealing the chamber part after the secondary battery cell is seated on the first plate; measuring an initial pressure value of the secondary battery cell before the internal space of the chamber part is vacuum formed; forming a vacuum in the internal space of the chamber part; measuring an inspection pressure value of the secondary battery cell after the internal space of the chamber part is vacuum formed; performing calculation to determine whether a leak occurs in the secondary battery cell; and determining whether a leak occurs in the secondary battery cell.

According to another embodiment of the present disclosure, in the leak inspection method for secondary battery cells according to the present disclosure, the performing calculation may include: zero setting initial pressure values measured by sensor nodes of the pressure distribution detection part; calculating modified inspection pressure values by subtracting the initial pressure values from inspection pressure values of the sensor nodes; and deriving an average value of the modified inspection pressure values of the sensor nodes.

According to still another embodiment of the present disclosure, in the leak inspection method for secondary battery cells according to the present disclosure, the performing calculation may include: calculating changes in the initial pressure values and the inspection pressure values for the individual sensor nodes of the pressure distribution detection part; and calculating an average value of the changes for the sensor nodes.

According to still another embodiment of the present disclosure, in the leak inspection method for secondary battery cells according to the present disclosure, the determining whether a leak occurs may include: determining whether a leak occurs in the secondary battery cell by comparing an average value of the modified inspection pressure values with a reference set value.

The present disclosure has the following effects by the above configurations.

According to the present disclosure, it is possible to easily determine whether a leak has occurred by creating a pressure difference between the inside of a casing of a secondary battery cell accommodated in a chamber part and the internal space of the chamber part and detecting swelling of the secondary battery cell.

Furthermore, according to the present disclosure, it is possible for an operator to visually check the degree of vacuum formation in the space inside a chamber part by forming a pressure sensor on one side of the chamber part.

Furthermore, according to the present disclosure, a chamber part can be easily sealed and opened by not forming a separate configuration for coupling between a moving part and a cover part.

Furthermore, according to the present disclosure, space efficiency can be improved by forming a pressure distribution detection part disposed on one side of a second plate as a film-type pressure measurement distribution sensor (or surface pressure sensor).

Furthermore, according to the present disclosure, a leak point can be identified in a secondary battery cell being inspected by utilizing a pressure distribution detection part of a pressure measurement distribution sensor as mentioned above.

Furthermore, according to the present disclosure, intuitive recognition by an operator is possible since a pressure value for each sensor node measured by a pressure distribution detection part is displayed as a numerical value or as in different colors for each pressure value by means of a display part of a controller.

Furthermore, according to the present disclosure, the lifespan of a pressure distribution detection part can be extended and sensitivity can be improved by placing a cushioning material between the pressure distribution detection part and a second plate or on the surface of the second plate opposite to a secondary battery cell.

Furthermore, according to the present disclosure, the opposing surface of a secondary battery cell being inspected can be maintained flat by utilizing a cushioning material as mentioned above.

Furthermore, according to the present disclosure, by forming multiple inspection parts within a single chamber part, simultaneous inspection of multiple secondary battery cells is possible, thereby improving process efficiency.

Furthermore, according to the present disclosure, losses due to the vacuum pump on/off operation time can be prevented as much as possible by allowing a vacuum pump to operate at all times.

Furthermore, according to the present disclosure, the vacuum formation time in the internal space of a chamber part can be shortened as much as possible by forming a plurality of vacuum pumps.

Furthermore, according to the present disclosure, the time for the internal pressure of a chamber part to reach atmospheric pressure can be shortened by forming a vacuum breaking part that supplies gas such as inert gas to the internal space of the chamber part after completing a leak inspection.

Furthermore, according to the present disclosure, it is possible to easily determine whether a secondary battery cell is a good product or not by providing a controller that determines whether the secondary battery cell leaks by setting initial pressure values of sensor nodes of a pressure distribution detection part to zero, calculating a modified inspection pressure value for each sensor node by subtracting an initial pressure value corresponding to an inspection pressure value, and deriving an average value of modified inspection pressure values of all sensor nodes.

Furthermore, according to the present disclosure, it is possible to minimize the load on a controller by providing the controller that determines whether a secondary battery cell leaks by calculating the amount of change in an initial pressure value and an inspection pressure value for each sensor node of a pressure distribution detection part, and calculating an average value of the changes of all sensor nodes, thereby eliminating the need for a separate zero setting.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, embodiments of the present disclosure will be described in more detail with reference to the accompanying drawings. The embodiments of the present disclosure may be modified in various forms, and the scope of the present disclosure should not be construed as being limited to the following embodiments, but should be construed based on the matters described in the claims. In addition, these embodiments are only provided for reference in order to more completely explain the present disclosure to those of ordinary skill in the art.

As used herein, the singular form may include the plural form unless the context clearly indicates otherwise. In addition, as used herein, "comprise" and/or "comprising" specify the presence of the recited shapes, numbers, steps, operations, members, elements, and/or groups thereof, but do not exclude the presence or addition of one or more other shapes, numbers, steps, operations, members, elements, and/ or groups thereof.

Each component "~part" below may be a single "part" implemented by multiple hardware configurations, or an individual "part" implemented by an individual hardware configuration, and there is no particular limitation thereon.

Figure 1:
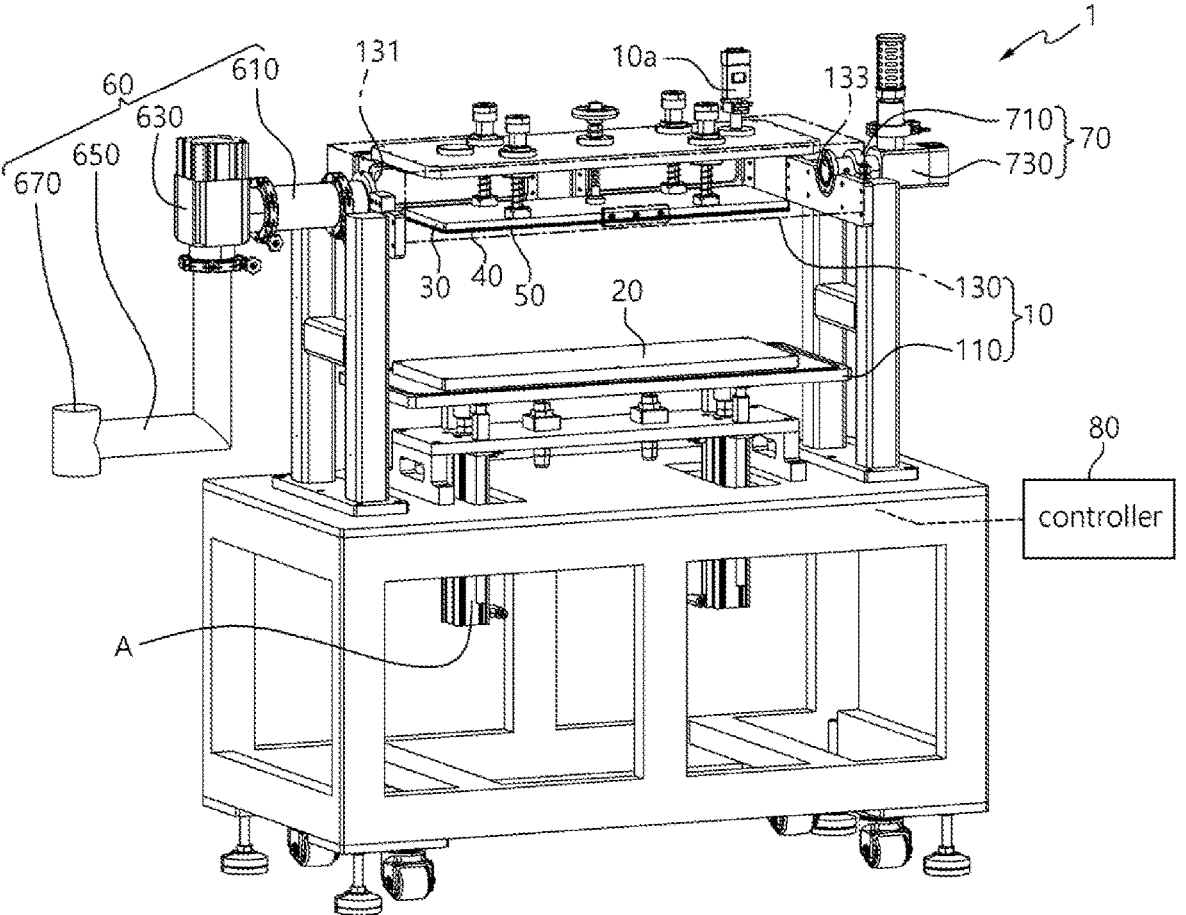
FIG. 1 is a perspective view of a leak inspection apparatus for secondary battery cells according to an embodiment of the present disclosure.
Figure 2:
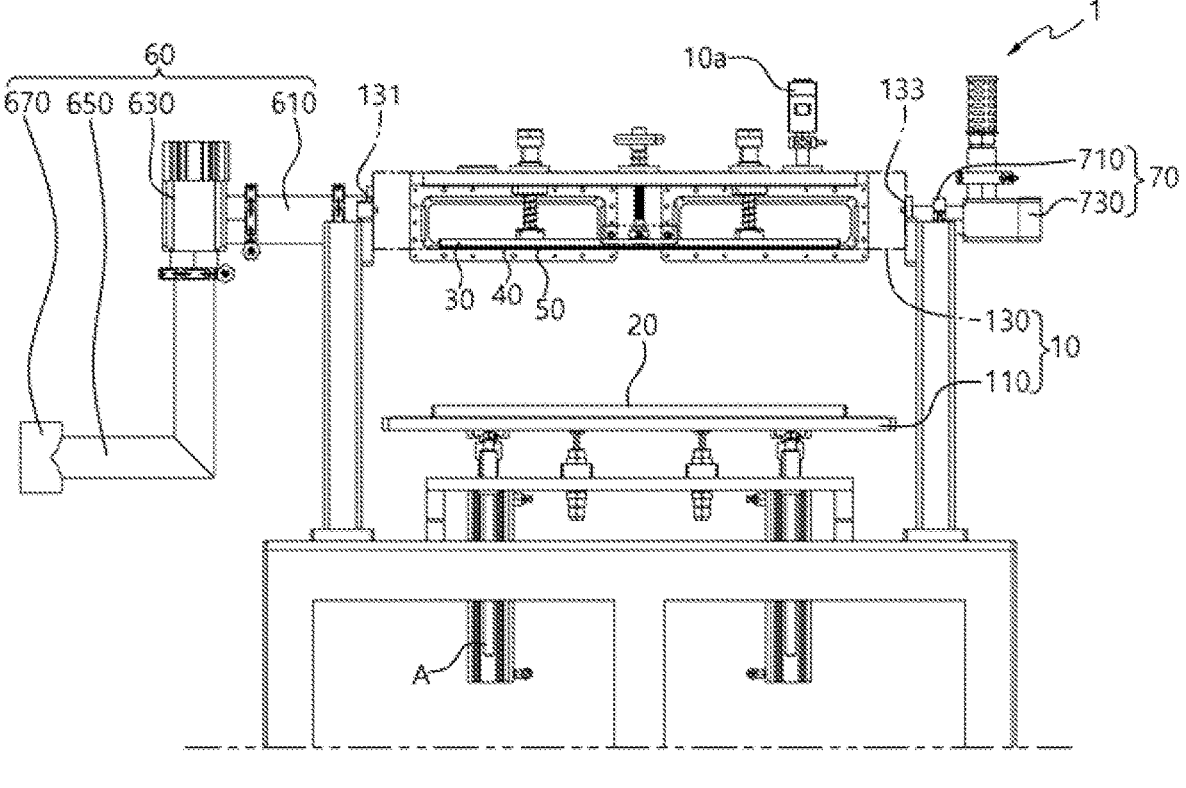
FIG. 2 is a front view of a leak inspection part according to FIG. 1.

FIG. 1 is a perspective view of a leak inspection apparatus for secondary battery cells according to an embodiment of the present disclosure, and FIG. 2 is a front view of a leak inspection part according to FIG. 1.

Hereinafter, a leak inspection apparatus 1 for secondary battery cells according to an embodiment of the present disclosure will be described in detail with reference to the attached drawings. It should be noted that the inspection apparatus 1 is applicable for leak inspection of pouch-type secondary battery cells or square-shaped secondary battery cells.

Referring to FIGS. 1 and 2, the present disclosure relates to a leak inspection apparatus 1 for secondary battery cells and, more particularly, to a leak inspection apparatus 1 for secondary battery cells to determine whether leakage occurs in a secondary battery cell 9 being inspected by creating a pressure difference between the inside of a casing 91 of the secondary battery cell 9 accommodated in a chamber part 10 and the internal space of the chamber part 10 and detecting swelling of the secondary battery cell 9.

To this end, the leak inspection apparatus 1 for secondary battery cells may include a chamber part 10, a first plate 20, a second plate 30, a pressure distribution detection part 40, a buffer member 50, a vacuum part 60, a vacuum breaking part 70, and a controller 80.

Hereinafter, the first plate 20, the second plate 30, and the pressure distribution detection part 40, and the buffer member 50 arranged as necessary will be collectively referred to as the "inspection part". The inspection part is understood to be configured to determine whether a leak has occurred in the secondary battery cell 9.

Figure 3A:
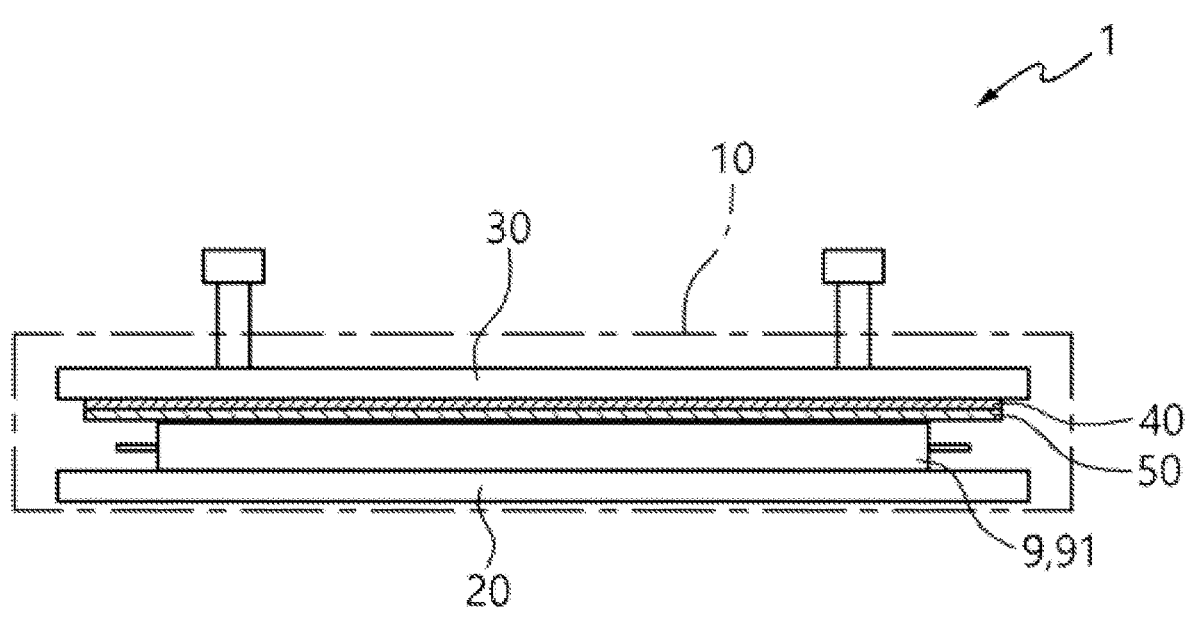
FIGS. 3A and 3B are reference diagrams for the internal space of a chamber part according to FIG. 1.
Figure 3B:
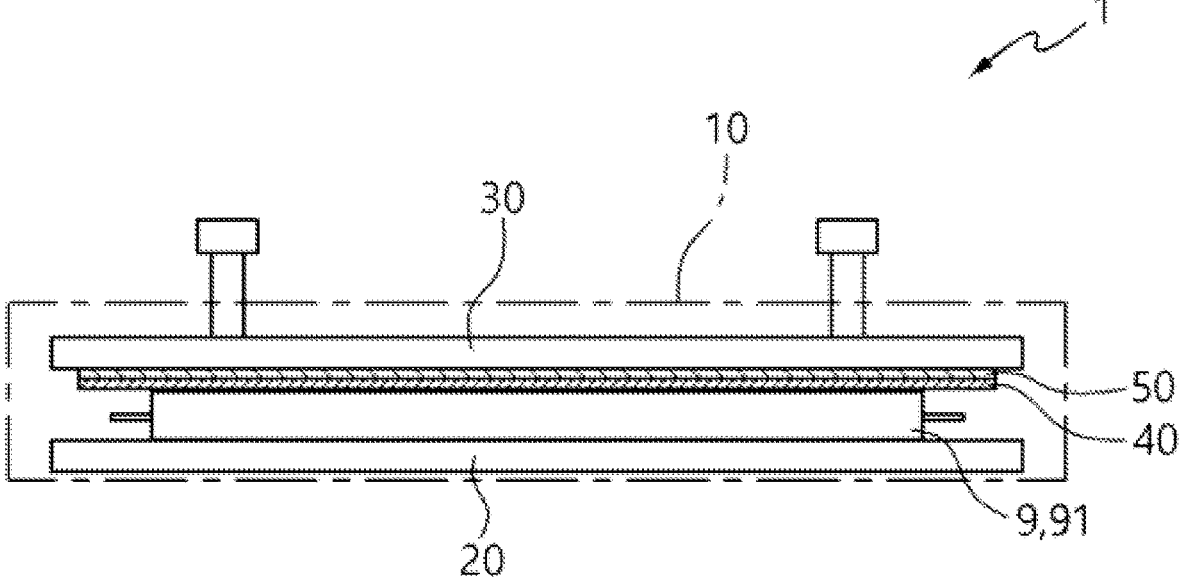
Figure 4A:
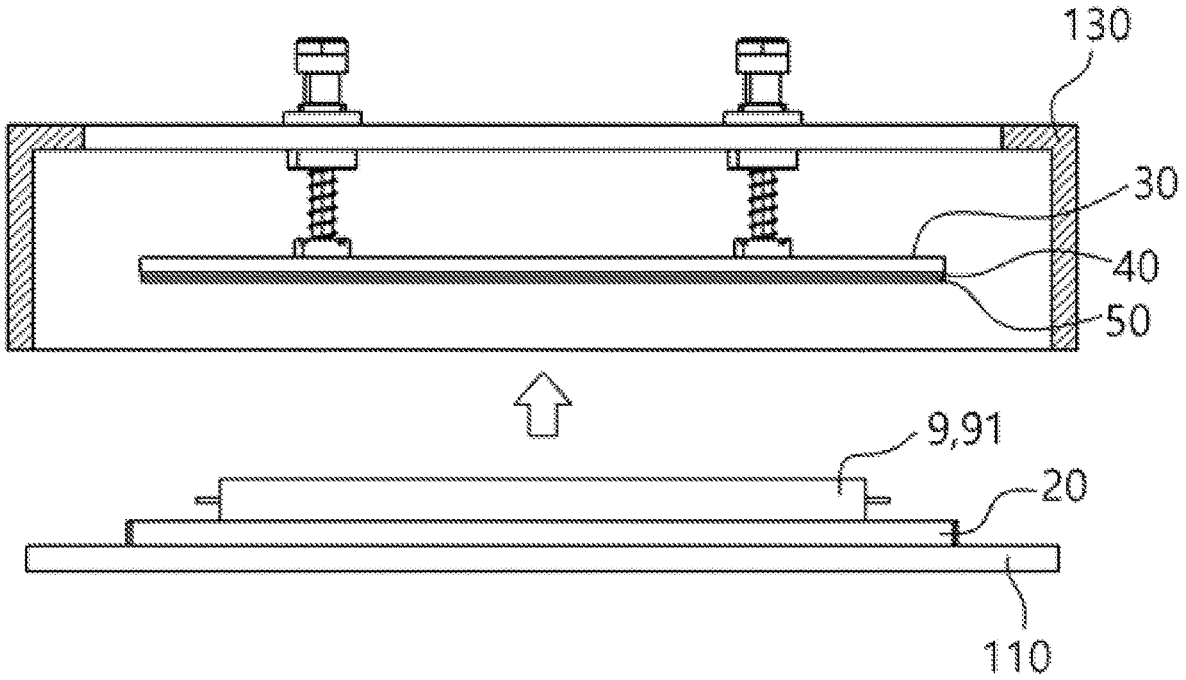
FIGS. 4A and 4B are reference diagrams showing the operation process of the chamber part according to FIG. 1.
Figure 4B:
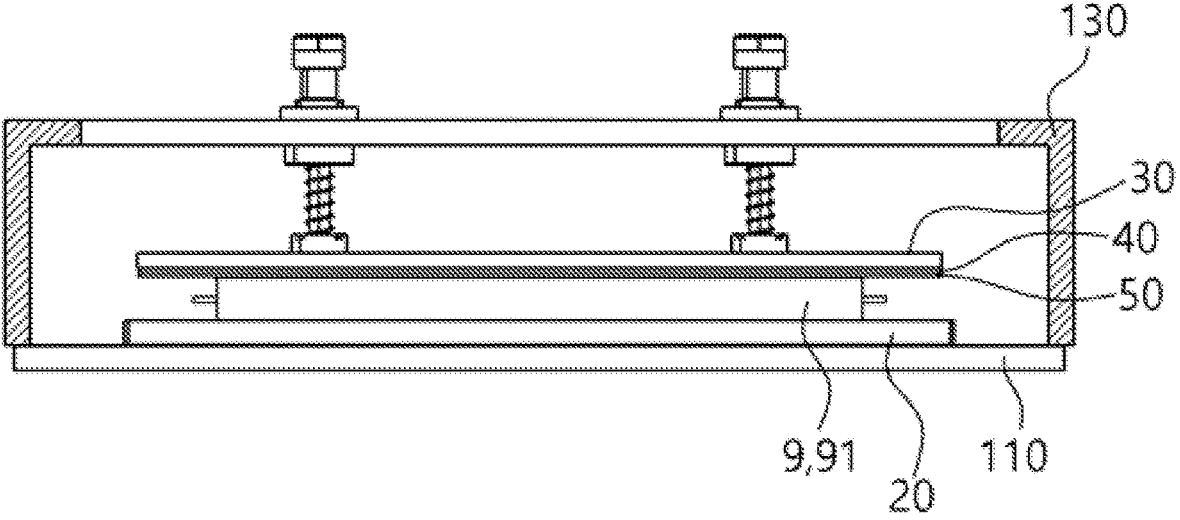

FIGS. 3A and 3B are reference diagrams for the internal space of a chamber part according to FIG. 1, and FIGS. 4A and 4B are reference diagrams showing the operation process of the chamber part according to FIG. 1.

Referring to FIGS. 1 to 4B, the chamber part 10 is configured to open and close one side thereof to create a vacuum environment for the inspection part disposed in the internal space of the chamber part 10. The chamber part 10 may be formed, for example, in a roughly hexahedral shape, but there is no particular limitation thereon.

A pressure sensor 10*a* (see FIGS. 1 and 2) may be formed on one side of the chamber unit 10, for example, on the upper surface of the chamber unit 10. Thus, an operator may visually check the degree of vacuum formation in the internal space of the chamber part 10 through the pressure sensor 10*a*.

In addition, the chamber part 10 may include a moving part 110 and a cover part 130.

The moving part 110 is configured so that one side thereof is connected to a moving means A and moves in a direction adjacent to or in the opposite direction to the cover part 130. The first plate 20, which will be described later, may be maintained seated on the surface of the moving part 110 facing the cover part 130. Accordingly, when the secondary battery cell 9 to be inspected is placed on the first plate 20, the secondary battery cell 9 may move to the internal space of the cover part 130 according to the movement of the moving part 110 (see FIGS. 4A and 4B). Although in the drawings, the bottom of the moving part 110 is shown to be connected to the moving means A and raised and lowered, the moving part 110 may move in the lateral direction and be combined with the cover part 130, and there are no limitations on its arrangement and moving direction. In some cases, the cover part 130 may be configured to be raised and lowered while the moving part 110 is fixed in the vertical direction.

In addition, because during a leak inspection, a vacuum environment is created in the internal space of the chamber part 10, a force is applied to the moving part 110 to push the moving part 110 toward the internal space (the opposite side of the cover part 130) due to the pressure difference with the external space. Thus, a separate component combining the moving part 110 and the cover part 130 is not required. The above-mentioned term "moving means A" may be any of various known configurations such as hydraulic cylinders, pneumatic cylinders, motors, etc., and the scope of the present disclosure is not limited by the specific examples.

The cover part 130 is formed at a preset position and forms, together with the moving part 110, an internal space where the inspection part will be located. The cover part 130 may have a side that is at least partially open so that the surface facing the moving part 110 is closed or opened by the moving part 110. In addition, the cover part 130 may be configured to be movable relative to the moving part 110 as needed or may be configured to be fixed at a set position, but there is no particular limitation thereon. To create a vacuum environment and break the vacuum in the internal space of the chamber part 10, a first communication hole 131 in communication with the vacuum part 60 may be formed on the first side of the cover part 130, and a second communication hole 133 in communication with the vacuum breaking part 70 may be formed on the second side of the cover part 130 (see FIGS. 1 and 2). In contrast, when the vacuum part 60 and the vacuum breaking part 70 share the same pipe, only one communication hole may be formed. In addition, the communication hole 131 and/or 133 may be formed on one side of the moving part 110 rather than the cover part 130. The cover part 130 may be provided in substantially the same shape as the moving part 110 or may be provided in a different shape.

Figure 5:
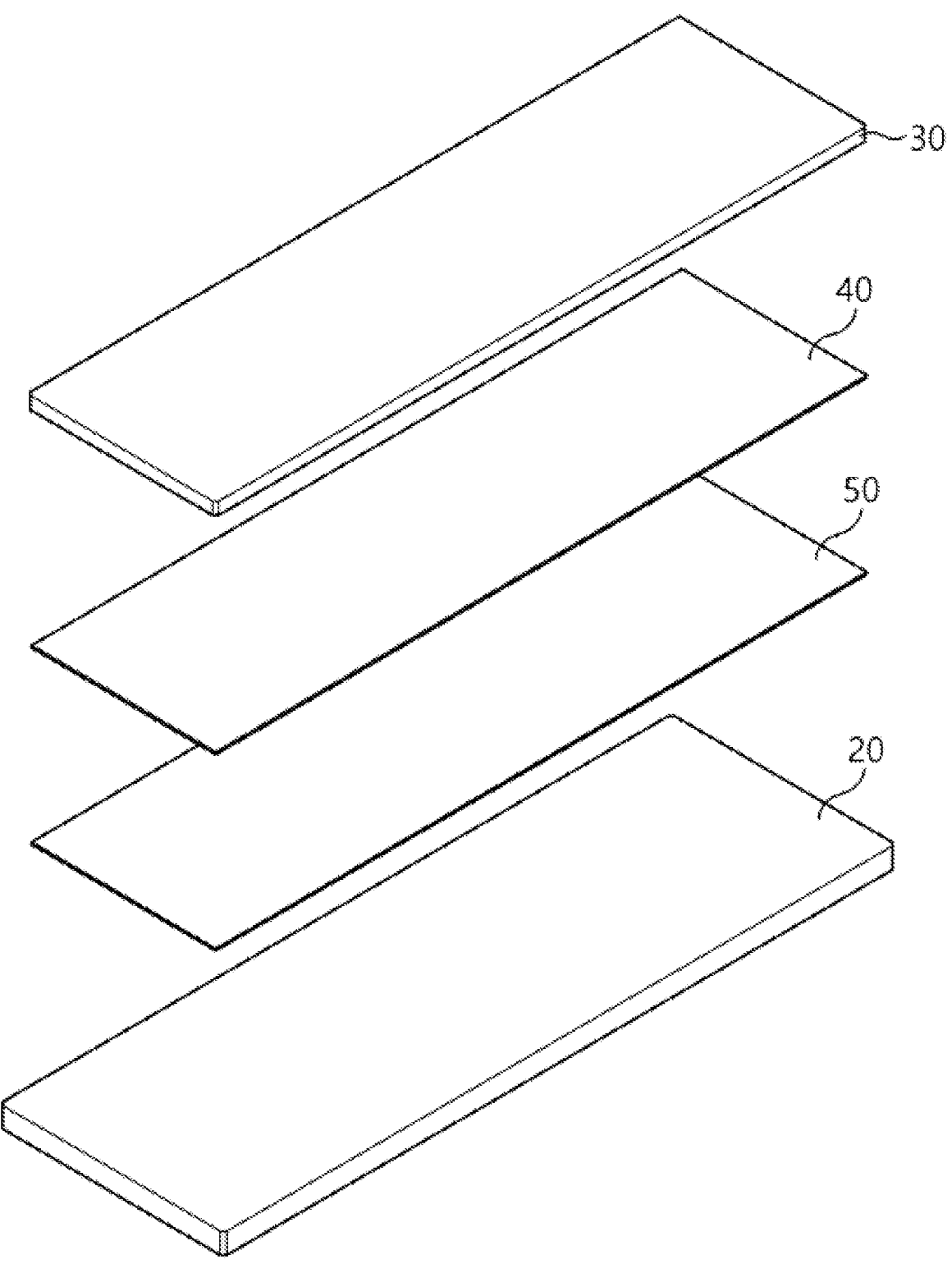
FIG. 5 is an exploded perspective view of the inspection part according to FIG. 1.

FIG. 5 is an exploded perspective view of the inspection part according to FIG. 1.

Referring to FIGS. 1 to 5, the first plate 20 is disposed on one side of the moving part 110 and is configured to seat the secondary battery cell 9 to be inspected. The first plate 20 may be formed, for example, in a plate-shaped structure, but the scope of the present disclosure is not limited thereto. When a leak inspection is performed on the secondary battery cell 9, the first plate 20 and the second plate 30 may directly or indirectly press and secure both sides of the cell 9 and prevent swelling from occurring before a vacuum environment is created. In addition, unlike what is shown in FIGS. 3A and 3B, the first plate 20 and the second plate 30 are arranged in a vertical direction so that the secondary battery cell 9 may be pressed in an upright state.

The second plate 30 is provided in the internal space of the cover part 130 and presses, together with the first plate 20, the secondary battery cell 9. The second plate 30 may be formed to have substantially the same shape as the first plate 20 and may be fixedly disposed in the internal space of the cover part 130. In addition, it is preferable that elastic means such as a spring are disposed on the second plate 30 on the side opposite to the pressure surface of the secondary battery cell 9 to facilitate pressurization of the second plate 30 against the cell 9.

Figure 6:
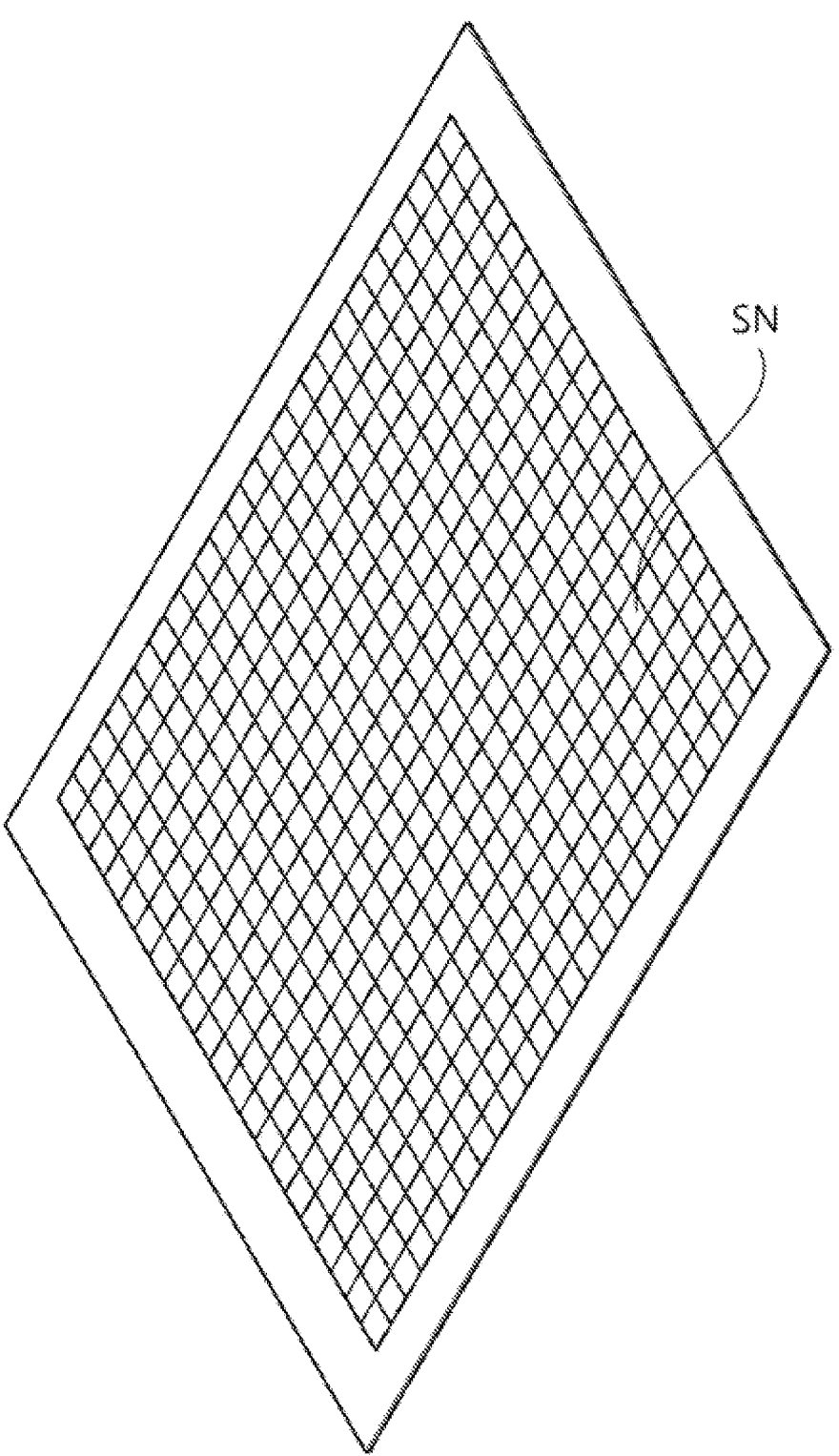
FIG. 6 is a reference diagram of a pressure distribution detection part according to FIG. 1.

FIG. 6 is a reference diagram of a pressure distribution detection part according to FIG. 1.

Referring to FIGS. 1 to 6, the pressure distribution detection part 40 is a sensor configuration that is disposed on one side of the second plate 30 opposite the first plate 20 and detects the pressure of the secondary battery cell 9. The pressure distribution detection part 40 may be placed directly on one side of the second plate 30 (see FIG. 3A), or may be disposed on the buffer member 50 on one surface of the second plate 30 (see FIG. 3B). In addition, the pressure distribution detection part 40 is, for example, a film-type pressure measurement distribution sensor and may include n (n (natural number)>2) sensor nodes SN. As an example, the pressure distribution detection part 40 may include about 800 sensor nodes SN, and may convert an analog signal for a pressure value measured for each sensor node SN into a digital signal and transmit the digital signal to the controller 80. Accordingly, the controller 80 may display the pressure value for each sensor node SN on a display part (not shown) with, for example, 0 and 255 as the lower limit and upper limit, respectively. Separately or additionally as needed the controller 80 may display different colors for individual sensor nodes SN on the display part according to the pressure value to enable intuitive recognition by an operator. Due to the pressure distribution detection part 40, the pressure value at each point or location of the secondary battery cell 9 being inspected may be measured.

When a leak inspection is performed on the secondary battery cell 9, a vacuum environment may be created in the internal space of the chamber part 10. In this case, the "vacuum environment" is an environment where the pressure is less than atmospheric pressure, and may mean an environment with a pressure value smaller than the internal pressure of the casing 91 of the secondary battery cell 9. When creating such a vacuum environment, in the secondary battery cell 9 of good quality, the inside of the cell 9 has a pressure value greater than the internal space of the chamber part 10, and thus swelling occurs. In addition, in the secondary battery cell 9 where a leak occurs, since the internal space of the cell 9 and the chamber part 10 substantially communicates at the leak point, swelling may not occur or may occur relatively less. Thus, it is possible to determine whether a product is good or not by detecting the swelling of the secondary battery cell 9 by means of the pressure distribution detection part 40.

In some cases, a "vacuum environment" is an environment where the pressure is less than atmospheric pressure, and may mean an environment with a pressure value greater than the internal pressure of the casing 91 of the secondary battery cell 9. In this case, swelling does not occur in a good quality secondary battery cell 9, but swelling may occur in a leaky secondary battery cell 9. Thus, swelling is not induced in at least the secondary battery cell 9 of good quality, thereby preventing the burden placed on the cell 9.

Referring to FIGS. 1 to 5, the buffer member 50 is disposed between the pressure distribution detection part 40 and the second plate 30 or on the surface of the second plate 30 facing the secondary battery cell 9 (see FIGS. 3A and 3B). The buffer member 50 may be made of, for example, a silicon material, but the scope of the present disclosure is not limited thereto. The buffer member 50 prevents the pressure distribution detection part 40 from directly contacting the secondary battery cell 9, thereby extending the lifespan of the pressure distribution detection part 40. In addition, the buffer member 50 may improve the sensitivity of the pressure distribution detection part 40 by spreading the pressure transmitted to the pressure distribution detection part 40. In addition, the buffer member 50 may help ensure that the opposing surface of the secondary battery cell 9 remains flat at all times, thereby contributing to more accurate pressure measurements.

The above-mentioned inspection part 20 to 50 may be provided as one in the internal space of the chamber part 10, or a plurality of inspection parts may be provided to enable leak inspection of several secondary battery cells 9 in one process, but there is no limitation thereto. The inspection part 20 to 50 may pressurize the secondary battery cell 9 subject to inspection in a vertical direction or in a lateral direction.

Referring to FIGS. 1 to 2, the vacuum part 60 is configured to communicate with one side of the chamber part 10 to create a vacuum environment for the internal space of the chamber part 10. To this end, the vacuum part 60 may include a first pipe 610, a first valve 630, a second pipe 650, and a vacuum pump 670.

The first pipe 610 is a pipe configured to communicate with the internal space of the chamber part 10, and may communicate with the chamber part 10 through, for example, the first communication hole 131.

The first valve 630 is provided between the first pipe 610 and the second pipe 650, and whether or not a vacuum environment is created in the internal space of the chamber part 10 may be determined by the opening and closing operation of the first valve 630. That is, when the first valve 630 is opened, a vacuum environment may be created in the internal space of the chamber part 10. In addition, upon completion of a leak inspection, the first valve 630 is closed, and the creation of a vacuum environment may be completed by means of the vacuum breaking part 70, which will be described later. The first valve 630 may be a check valve, for example.

The a second pipe 650 is a pipe configuration in which one end thereof is connected to the first valve 630 and the other end thereof is connected to the vacuum pump 670.

The vacuum pump 670 is a pump configuration for creating a vacuum environment in the internal space of the chamber part 10. The vacuum pump 670 operates continuously, for example, and depending on the opening and closing of the first valve 630, the vacuum formation in the internal space of the chamber part 10 may be determined. By continuously operating the vacuum pump 670 in this way, TACT time loss due to the on/off time of the vacuum pump 670 may be prevented, but the scope of the present disclosure is not limited thereto. In addition, in some cases, a plurality of vacuum pumps 670 may be provided by an additional piping structure.

The vacuum breaking part 70 is configured to supply gas to the internal space of the chamber part 10 in which a vacuum environment is created. Thus, after a leak inspection of the secondary battery cell 9 is completed, gas may be supplied through the vacuum breaking part 70. The gas may be an inert gas, by which the vacuum breaking time may be shortened. In some cases, the gas may be air. To this end, the vacuum breaking part 70 may include a third pipe 710 and a second valve 730.

The third pipe 710 is a pipe configured to communicate with the internal space of the chamber part 10, and may communicate with the chamber part 10 through, for example, the second communication hole 133. Alternatively, the third pipe 710 may be provided in a structure branching from the first pipe 610.

The second valve 730 is provided at the end of the third pipe 710 and is a valve configuration in which gas supply is determined depending on the opening and closing thereof. The second valve 730 may be a check valve, for example.

Figure 7:
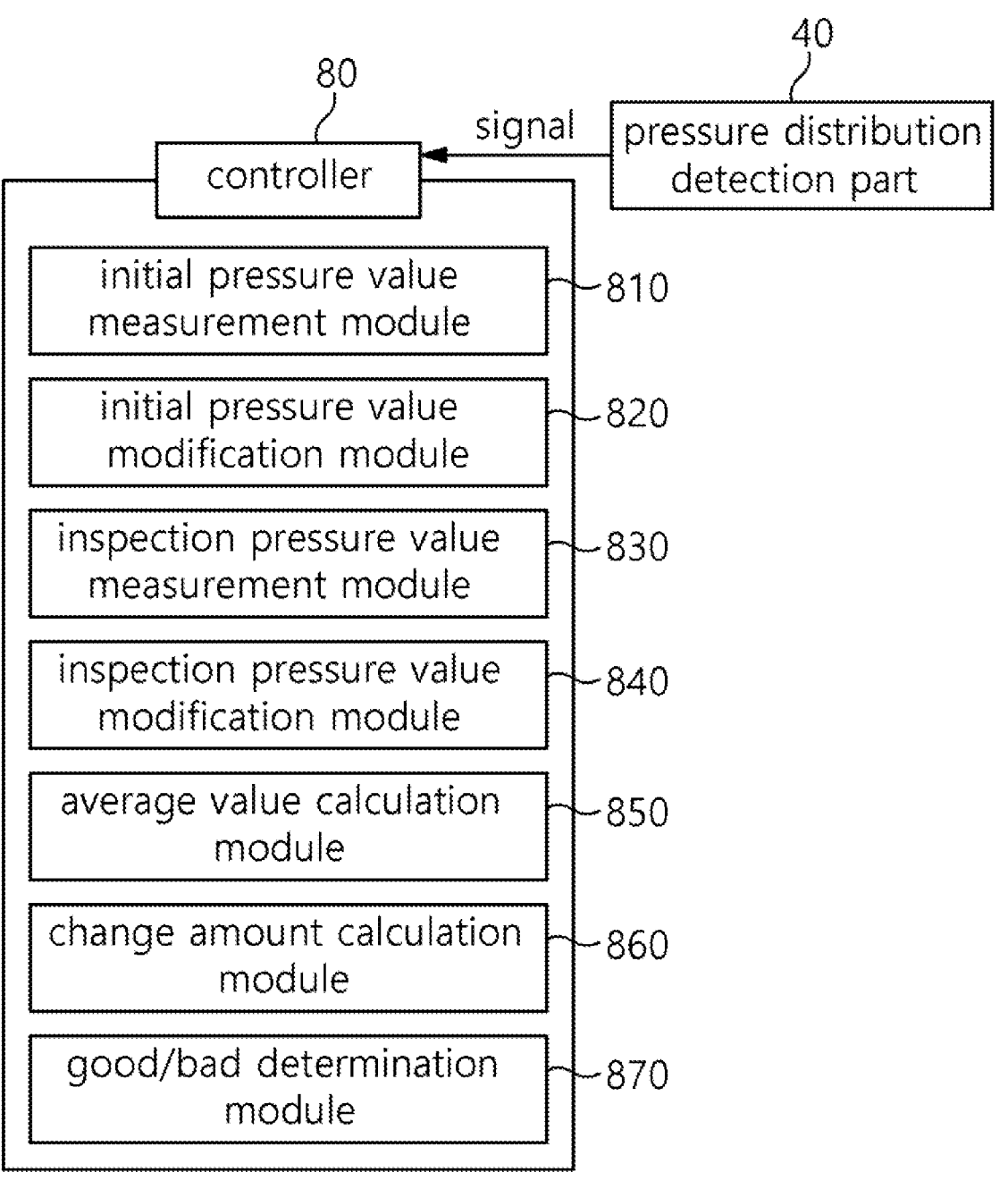
FIG. 7 is a block diagram of a controller according to FIG. 1.

FIG. 7 is a block diagram of a controller according to FIG. 1.

Referring to FIGS. 1, 2, and 7, the controller 80 is configured to control the overall operation of the leak inspection apparatus 1. To this end, the controller 80 may include an initial pressure value measurement module 810, an initial pressure value modification module 820, an inspection pressure value measurement module 830, an inspection pressure value modification module 840, an average value calculation module 850, a change amount calculation module 860, and a good/bad determination module 870.

The initial pressure value measurement module 810 is a module that measures the initial pressure values of the sensor nodes SN of the pressure distribution detection part 40. The initial pressure value measurement module 810 may receive signals about the pressure value of each sensor node SN measured through the pressure distribution detection part 40 in a state in which the first plate 20 and the second plate 30 in the chamber part 10 pressurize and fix the secondary battery cell 9 before a vacuum environment is created in the internal space of the chamber part 10. That is, when the chamber part 10 is closed and before a vacuum environment is created, a certain level of pressure is inevitably applied to the sensor nodes SN of the pressure distribution detection part 40 due to atmospheric pressure or pressurization of the secondary battery cell 9, and the initial pressure value measurement module 810 is a module that measures the applied pressure.

The initial pressure value modification module 820 is a module that sets the initial pressure values of the sensor nodes SN of the pressure distribution detection part 40 to zero. That is, the initial pressure value modification module 820 is a module that modifies the initial pressure value for each sensor node SN measured through the initial pressure value measurement module 810 to "0". For example, when the initial pressure value of any sensor node SN is 92, the module calculates 92-92 and modifies the initial pressure value of all sensor nodes SN to 0. In addition, the initial pressure values are stored to correspond to individual sensor nodes SN.

The inspection pressure value measurement module 830 is a module that measures a signal for the pressure value of each sensor node SN measured through the pressure distribution detection part 40 after a vacuum environment is created in the internal space of the chamber part 10. As previously described, in a state in which the first plate 20 and the second plate 30 pressurize the secondary battery cell 9, when the cell 9 is good or defective, swelling may occur and an inspection pressure value above a predetermined level may be measured. In addition, as swelling does not occur in the cell 9 or occurs relatively less, an inspection pressure value that falls below a predetermined level may be measured.

The inspection pressure value modification module 840 is a module that modifies the inspection pressure value for each sensor node SN of the pressure distribution detection part 40 after a vacuum is formed in the internal space of the chamber part 10. That is, the inspection pressure value modification module 840 modifies the inspection pressure value for each sensor node SN measured by the inspection pressure value measurement module 830. To be specific, the inspection pressure value modification module 840 may derive a modified inspection pressure value for each individual node SN by subtracting the corresponding initial pressure value from the inspection pressure value measured for each sensor node SN. Thus, the inspection pressure value modification module 840 assumes the zero set of the initial pressure value modification module 820.

The average value calculation module 850 is a module that calculates the average value of the modified inspection pressure values for sensor nodes SN calculated by the inspection pressure value modification module 840.

The change amount calculation module 860 is a module that calculates the amount of changes in the initial pressure values for sensor nodes SN of the pressure distribution detection part 40 before a vacuum is formed in the internal space of the chamber part 10, and in the inspection pressure values after the vacuum is formed, and then calculates the average value of the changes of all sensor nodes SN. Since the change amount calculation module 860 is a module that calculates the amount of change in the initial pressure value and the inspection pressure value, it has the advantage of not necessarily requiring zero set. That is, the change amount calculation module 860 determines whether the secondary battery cell 9 is good or bad in a different way from the preceding modules 820, 840, and 850.

The good/bad determination module 870 is a module that compares the average value of the modified inspection pressure values derived by the average value calculation module 850 and/or the average value of the pressure value changes derived by the change amount calculation module 860 with a reference set value, and determines whether a leak occurs in the secondary battery cell 9. The reference set value may be a fixed pressure value or a pressure value in a numerical range having a lower limit and an upper limit. When the average value of the modified inspection pressure values derived by the average value calculation module 850 and/or the average value of the pressure value changes derived by the change amount calculation module 860 is below or below the set value, it may be determined that a leak has occurred or has not occurred.

Figure 8:
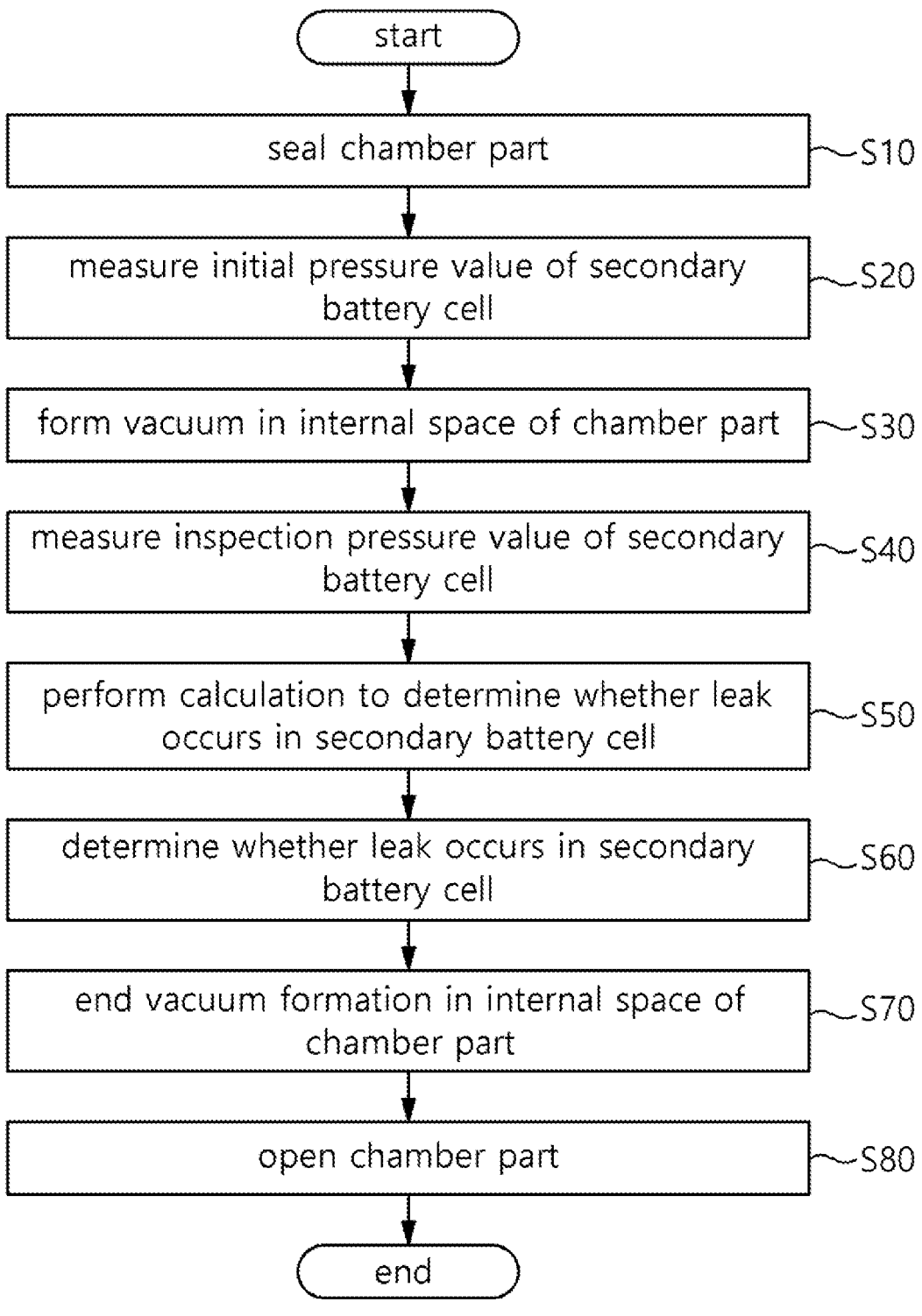
FIG. 8 is a flowchart of a leak inspection method for secondary battery cells according to an embodiment of the present disclosure.

FIG. 8 is a flowchart of a leak inspection method for secondary battery cells according to an embodiment of the present disclosure.

Hereinafter, a leak inspection method S1 for secondary battery cells according to an embodiment of the present disclosure will be described in detail with reference to the attached drawings. Since the method S1 may be performed by means of the above-described inspection apparatus 1, detailed description of overlapping content will be omitted. In addition, it should be noted that the leak inspection method S1 may in some cases be performed in a different time sequence from that shown and/or described in the drawings.

Referring to FIG. 8, first, after the secondary battery cell 9 is seated on the first plate 20, the chamber part 10 is sealed (S10). Step S10 may be performed by moving the moving part 110 toward the cover part 130 by, for example, driving the moving means A, or may be performed by moving the cover part 130 toward the moving part 110. In step S10, both sides of the secondary battery cell 9 may be maintained in a state where the sides are directly or indirectly pressed by the first plate 20 and the second plate 30.

Then, an initial pressure value of the secondary battery cell 9 is measured before creating a vacuum environment in the internal space of the chamber part 10 (S20). To describe step S20 in detail, the pressure applied to the surface of the secondary battery cell 9 is measured through the pressure distribution detection part 40, and the initial pressure value measurement module 810 of the controller 80 may receive the digital signal from the pressure distribution detection part 40.

Thereafter, a vacuum is formed inside the chamber part 10 (S30). Step S30 may be performed by opening the first valve 630 to allow the first pipe 610, the second pipe 630, and the vacuum pump 670 to communicate.

As a follow-up process, an inspection pressure value of the secondary battery cell 9 disposed in the internal space of the vacuum-formed chamber part 10 is measured (S40). Step S40 is performed by means of the pressure distribution detection part 40, and the measured inspection pressure value may be transmitted to the inspection pressure value measurement module 830 of the controller 80.

Figure 9:
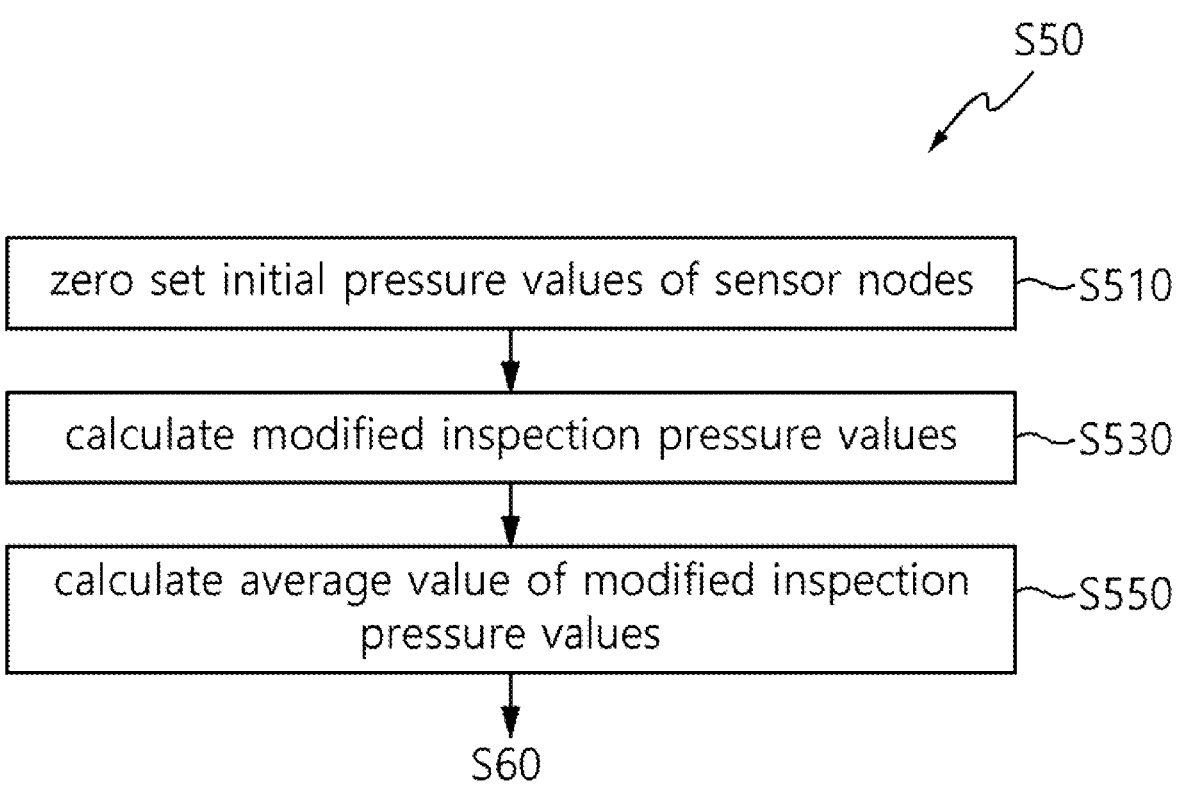
FIGS. 9 and 10 are flowcharts of determining whether a leak occurs according to FIG. 8.
Figure 10:
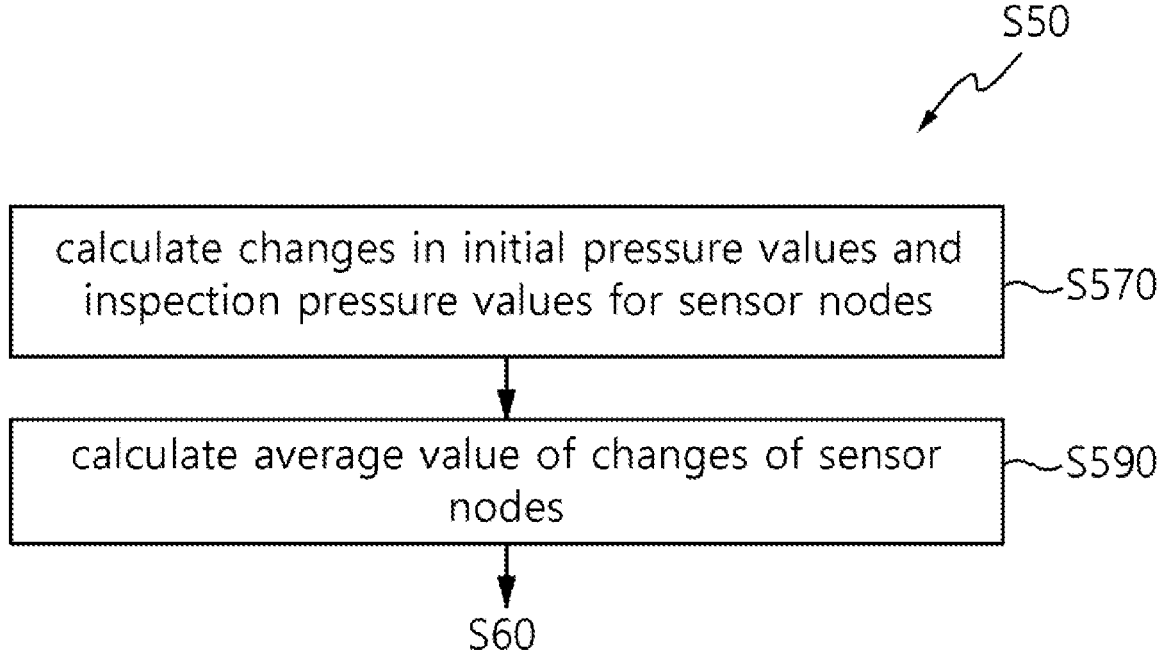

FIGS. 9 and 10 are flowcharts of determining whether a leak occurs according to FIG. 8.

Referring to FIG. 8, a calculation is performed to determine whether a leak has occurred in the secondary battery cell 9 (S50). Step S50 may be performed through the controller 80. Regarding the determination of the occurrence of such a leak, in a first embodiment (see FIG. 9), after setting initial pressure values of the sensor nodes SN to zero (S510), a modified inspection pressure value may be calculated by subtracting the initial pressure value of the sensor node SN corresponding to the inspection pressure value (S530). Then, an average value of the modified inspection pressure values of all sensor nodes SN may be derived (S550). Step S510 to S550 may be performed by means of the initial pressure value modification module 820, the inspection pressure value modification module 840, and the average value calculation module 850.

Alternatively, referring to FIGS. 8 and 10, in a second embodiment, after calculating the amount of change in an initial pressure value and an inspection pressure value for each sensor node SN (S570), an average change value of all sensor nodes SN is calculated (S590). Step S570 and S590 may be performed by means of the change amount calculation module 860. At this time, the first and second embodiments may be performed together in a single inspection process or may be performed selectively.

Referring to FIG. 8, after step S50, whether a leak occurs in the secondary battery cell 9 subject to inspection is determined (S60). Step S60 is performed by means of the good/bad determination module 870, and whether a leak occurs in the secondary battery cell 9 may be determined by comparing the average value of the modified inspection pressure values derived by the average value calculation module 850 and/or the average value of the pressure value changes derived by the change amount calculation module 860 with a reference set value.

Thereafter, vacuum formation in the internal space of the chamber part 10 ends (S70). Step S60 may be performed by closing the first valve 630 and opening the second valve 730, then supplying gas to the internal space of the chamber part 10 through the third pipe 710. As previously mentioned, the gas may be an inert gas, but the scope of the present disclosure is not limited thereto.

Thereafter, the chamber part 10 is opened (S80). Step S70 may be performed by, for example, driving the moving means A to move the moving part 110 in a direction away from the cover part 130. Due to this, the inspected secondary battery cell 9 may be discharged to the outside of the apparatus 1.

The above detailed description is illustrative of the present disclosure. In addition, the above description shows and describes preferred embodiments of the present disclosure, and the present disclosure can be used in various other combinations, modifications, and environments. In other words, changes or modifications are possible within the scope of the concept of the disclosure disclosed herein, the scope equivalent to the written disclosure, and/or within the scope of skill or knowledge in the art. The above-described embodiment describes the best state for implementing the technical idea of the present disclosure, and various changes required in the specific application field and use of the present disclosure are possible. Accordingly, the detailed description of the present disclosure is not intended to limit the present disclosure to the disclosed embodiments.

What is claimed is:

1. A leak inspection apparatus for secondary battery cells, the leak inspection apparatus comprising:
a chamber part configured to define an internal space;
a first plate disposed in the internal space of the chamber part and configured to support a first side of a secondary battery cell;
a second plate configured to press a second side of the secondary battery cell opposite to the first side of the secondary battery cell;
a pressure distribution detection part configured to be disposed between the second plate and the secondary battery cell, the pressure distribution detection part including a plurality of sensor nodes distributed such that the plurality of sensor nodes are configured to cover an entire area of the second side of the secondary battery cell, the plurality of sensor nodes being configured to detect pressure of the secondary battery cell;
a vacuum part configured to communicate with the internal space of the chamber part to form a vacuum in the internal space of the chamber part; and
a controller communicatively coupled to the pressure distribution detection part and configured to determine whether a leak occurs in the secondary battery cell.

2. The leak inspection apparatus of claim 1, wherein the chamber part comprises:
a moving part on which the first plate is seated on a side thereof; and
a cover part configured to form the internal space of the chamber part together with the moving part.

3. The leak inspection apparatus of claim 1, wherein the pressure distribution detection part is a film-type pressure measurement distribution sensor.

4. The leak inspection apparatus of claim 3, wherein the pressure distribution detection part includes sensor nodes and transmits a pressure value measured by each sensor node to the controller.

5. The leak inspection apparatus of claim 1, further comprising:
a buffer member between the pressure distribution detection part and the second plate or on a surface of the second plate facing the secondary battery cell,
wherein the buffer member contains silicone material.

6. The leak inspection apparatus of claim 1, wherein the vacuum part comprises:
a first pipe communicating with the internal space of the chamber part;
a first valve between the first pipe and a second pipe;
the second pipe with a first end thereof is connected to the first valve, and a second end thereof is connected to a vacuum pump; and
the vacuum pump that creates vacuum in the internal space of the chamber part.

7. The leak inspection apparatus of claim 6, wherein the vacuum pump operates during a leak inspection of the secondary battery cell.

8. The leak inspection apparatus of claim 1, further comprising:
a vacuum breaking part that supplies gas, after an inspection of the secondary battery cell is completed, to the internal space of the chamber part where the internal space is vacuum formed.

9. The leak inspection apparatus of claim 8, wherein the vacuum breaking part is configured to supply an inert gas to the internal space of the chamber part.

10. The leak inspection apparatus of claim 4, wherein the controller comprises:
an initial pressure value measurement module configured to receive the initial pressure values measured by the plurality of sensor nodes before the internal space of the chamber part is vacuum formed in a state where the chamber part is sealed; and
an inspection pressure value measurement module configured to receive the inspection pressure values of the plurality of sensor nodes after the internal space of the chamber part is vacuum formed.

11. The leak inspection apparatus of claim 10, wherein the controller further comprises:
an initial pressure value modification module configured to zero-set the initial pressure values of the plurality of sensor nodes; and
an inspection pressure value modification module configured to calculate modified inspection pressure values for the plurality of sensor nodes by subtracting the initial pressure values from the inspection pressure values.

12. The leak inspection apparatus of claim 11, wherein the controller further comprises:
an average value calculation module configured to calculate an average value of the modified inspection pressure values for the sensor nodes calculated by the inspection pressure value modification module.

13. The leak inspection apparatus of claim 10, wherein the controller further comprises:
a change amount calculation module configured to calculate changes between the initial pressure values and the inspection pressure values for the plurality of sensor nodes, and then calculate an average value of the changes for the sensor nodes.

14. The leak inspection apparatus of claim 13, wherein the controller further comprises:

a good/bad determination module configured to compare the average value with a reference set value to determine whether a leak occurs in the secondary battery cell.

15. The leak inspection apparatus of claim 1, wherein the first plate, the second plate, and the pressure distribution detection part are provided in plurality and arranged in parallel in the internal space of the chamber part.

16. A leak inspection method for secondary battery cells, the leak inspection method being performed using a leak inspection apparatus for secondary battery cells, the leak inspection apparatus comprising: a chamber part configured to define an internal space; a first plate disposed in the internal space of the chamber part and configured to support a first side of a secondary battery cell; a second plate configured to be spaced apart from the first plate and to press a second side of the secondary battery cell opposite to the first side of the secondary battery cell; a pressure distribution detection part configured to be disposed between the second plate and the secondary battery cell, the pressure distribution detection part including a plurality of sensor nodes distributed such that the plurality of sensor nodes are configured to cover an entire area of the second side of the secondary battery cell, the plurality of sensor nodes being configured to detect pressure of the secondary battery cell; a vacuum part configured to communicate with the internal space of the chamber part to form a vacuum in the internal space of the chamber part; a vacuum breaking part configured to supply gas, after an inspection of the secondary battery cell is completed, to the internal space of the chamber part where the internal space is vacuum formed; and a controller communicatively coupled to the pressure distribution detection part and configured to determine whether a leak occurs in the secondary battery cell, the leak inspection method comprising:

sealing the chamber part after the secondary battery cell is seated on the first plate;

measuring, by the plurality of sensor nodes, initial pressure values at the entire area of the second side of the secondary battery cell before the vacuum is formed in the internal space of the chamber part;

forming the vacuum in the internal space of the chamber part;

measuring, by the plurality of sensor nodes, inspection pressure values at the entire area of the second side of the secondary battery cell after the vacuum is formed in the internal space of the chamber part;

comparing the initial pressure values with the inspection pressure values; and determining whether a leak occurs in the secondary battery cell based on a comparison between the initial pressure values and the inspection pressure values.

17. The leak inspection method of claim 16, wherein the comparing comprises:

zero-setting the initial pressure values measured by plurality of sensor nodes of the pressure distribution detection part;

calculating modified inspection pressure values by subtracting the initial pressure values from the inspection pressure values of the plurality of sensor nodes; and deriving an average value of the modified inspection pressure values of the plurality of sensor nodes.

18. The leak inspection method of claim 16, wherein the comparing comprises:

calculating changes between the initial pressure values and the inspection pressure values for the plurality of sensor nodes of the pressure distribution detection part; and calculating an average value of the changes for the plurality of sensor nodes.

19. The leak inspection method of claim 17, wherein the determining whether a leak occurs comprises:

determining whether a leak occurs in the secondary battery cell by comparing an average value of the modified inspection pressure values with a reference set value.

* * * * *